F. WEBER.
CONTAINER.
APPLICATION FILED MAR. 26, 1920.

1,356,801.

Patented Oct. 26, 1920.

INVENTOR.
Fred Weber
By Warpham
Attorney

UNITED STATES PATENT OFFICE.

FRED WEBER, OF LOS ANGELES, CALIFORNIA.

CONTAINER.

1,356,801.    Specification of Letters Patent.    Patented Oct. 26, 1920.

Application filed March 26, 1920. Serial No. 368,831.

*To all whom it may concern:*

Be it known that I, FRED WEBER, a citizen of the U. S., residing in the city of Los Angeles, county of Los Angeles, State of California, have invented new and useful Improvements in Containers, of which the following is a specification.

My invention primarily relates to a container for holding cans containing ice cream or other frozen products or food or food products warmer than the outer air, and the object thereof is to provide a container top that provides means of easy access to the contents of the vessel in the container which automatically registers the closure for the opening of the top when the operator closes the same, thereby preventing the accidental escape of the air from the container.

Figure 1:
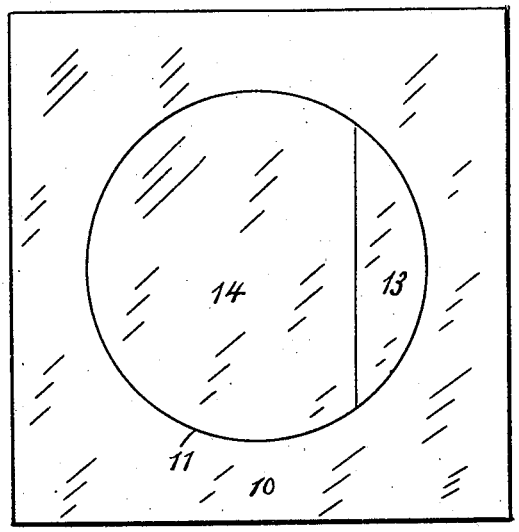
Figure 2:
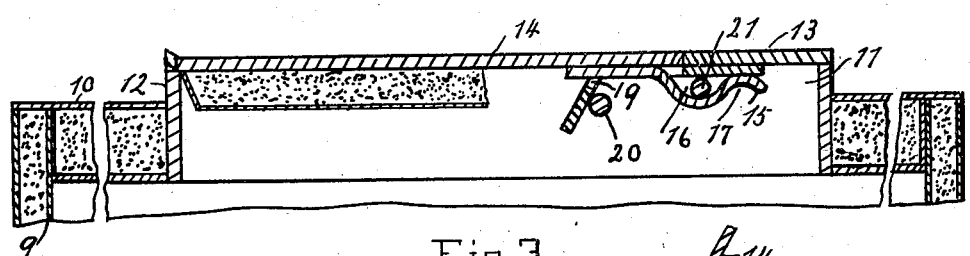
Figure 3:
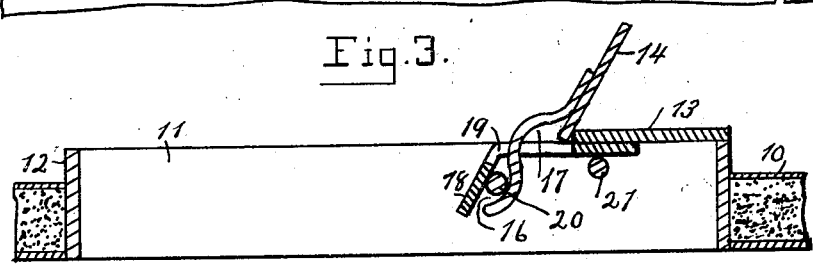
Figure 4:
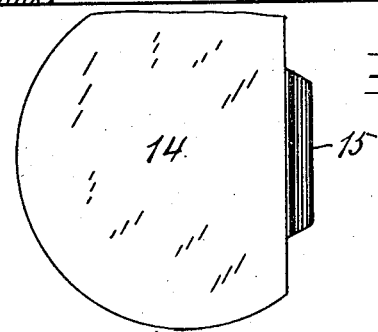

In the drawings forming a part of this application Figure 1 is a plan of the top of the container. Fig. 2 is an enlarged cross section of a portion of the top, parts being omitted for clearness of illustration and the movable part of the top in its closed position. Fig. 3 is a view like Fig. 2 with the movable part open, and portions omitted. Fig. 4 is a plan of the movable portion removed from the outer part of the top.

Referring to the drawings 9 is the body of the container and 10 is the outer portion of the container top and is of any desired configuration. In the drawings I have shown it square. In the central portion of the top shown is a circular opening 11 which is preferably surrounded by a wall 12 which projects a little above the other parts of the top surface of the outer portion. Opening 11 is shown closed in Fig. 2 by a cover composed of the stationary part 13 and the movable part 14 which I will call the lid. Secured to the under surface of the lid is a guide strip 15 which tapers at the ends as shown in Fig. 4 and is bent into longitudinal grooves 16 and 17 which open on opposite sides of the strip. To the under side of part 13 is secured a V-shaped ledge 18 which has an opening 19 as long as the longer edge of strip 15 through which projects strip 15. When the parts are assembled for use, ledge 18 has secured thereto the open holding rod 20 and the closed holding rod 21. The lid has a heat insulating lining and the outer portion also has a heat insulating lining. It will be observed that strip 15 with its grooves and ledge 18 with its rods form a detachable hinge which holds a lid properly in position in its open or closed position and that they are of such shape and so positioned that when closing the lid all that the operator has to do is to bring the outer position of the lid toward a closed position so that gravity will finish the closing, and let go of the lid when it will fall into place properly positioned, thereby saving the operator's time and avoiding any danger of the lid not being properly positioned.

Having described my invention I claim.

A container having a top provided with an opening therein; a V-shaped ledge having an opening therein secured to said top; holding rods secured to said ledge; a lid for said opening; a guide strip secured to the underside of the said lid and adapted to pass into the opening in the ledge and engage said holding rods, said guide strip being bent into grooves into which are secured said rods.

In witness that I claim the foregoing I have hereunto subscribed my name this 13th day of March, 1920.

FRED WEBER.